United States Patent
Havala et al.

(10) Patent No.: US 7,433,359 B2
(45) Date of Patent: *Oct. 7, 2008

(54) APPLICATION OF AN ETHERNET/MPLS HALF BRIDGE TO PROVIDE ETHERNET MULTIPLEXING FUNCTIONS (EMF) IN SONET NETWORK ELEMENTS (NES)

(75) Inventors: Paul F Havala, Plano, TX (US); Samuel V. Lisle, Fairview, TX (US); Biaodong Cai, San Ramon, CA (US); Floyd D. Ferguson, Irving, TX (US)

(73) Assignee: Fujitsu Limited, Kawasaki (JP)

( * ) Notice: Subject to any disclaimer, the term of this patent is extended or adjusted under 35 U.S.C. 154(b) by 929 days.

This patent is subject to a terminal disclaimer.

(21) Appl. No.: 10/856,586

(22) Filed: May 28, 2004

(65) Prior Publication Data

US 2005/0265329 A1 Dec. 1, 2005

(51) Int. Cl.
*H04L 12/28* (2006.01)
*H04J 3/16* (2006.01)

(52) U.S. Cl. .............. 370/395.5; 370/401; 370/466

(58) Field of Classification Search .......... 370/389, 370/395.5, 395.51, 395.53, 400, 401, 466
See application file for complete search history.

(56) References Cited

U.S. PATENT DOCUMENTS

| | | |
|---|---|---|
| 6,339,595 B1 | 1/2002 | Rekhter et al. |
| 6,633,571 B1 | 10/2003 | Sakamoto et al. |
| 6,757,298 B1 | 6/2004 | Burns et al. |
| 6,771,662 B1 | 8/2004 | Miki et al. |
| 6,788,681 B1 | 9/2004 | Hurren et al. |
| 6,985,488 B2 | 1/2006 | Pan et al. |
| 7,079,544 B2 | 7/2006 | Wakayama et al. |
| 7,242,665 B2 | 7/2007 | Langille et al. |
| 2002/0110087 A1 * | 8/2002 | Zelig et al. ............ 370/236 |
| 2002/0176450 A1 | 11/2002 | Kong et al. ............ 370/539 |
| 2003/0110268 A1 | 6/2003 | Kermarec |
| 2003/0174706 A1 | 9/2003 | Shankar et al. ........ 370/393 |
| 2003/0185223 A1 | 10/2003 | Tate et al. |
| 2004/0037279 A1 | 2/2004 | Zelig et al. |
| 2004/0076166 A1 | 4/2004 | Patenaude ............ 370/401 |
| 2004/0081172 A1 | 4/2004 | Ould-Brahim ........ 370/395.53 |
| 2004/0146058 A1 | 7/2004 | Nemoto et al. |

(Continued)

OTHER PUBLICATIONS

Paul F. Havala et al., U.S. Appl. No. 10/856,408, entitled "Application of an Ethernet/MPLS Half Bridge" to Provide Emulated Ethernet LAN Functions in Sonet Networks, May 26, 2004.

(Continued)

*Primary Examiner*—Hong Sol Cho
(74) *Attorney, Agent, or Firm*—Baker Botts L.L.P.

(57) ABSTRACT

A system and method for providing an application of an Ethernet/MPLS half bridge to provide Ethernet multiplexing functions (EMF) in SONET network elements (NEs). In one embodiment, a virtual private network includes a core network. The core network includes a SONET over shared label switching network. A plurality of Virtual Local Access Networks (VLANs) are each coupled to a Multiservice Provisioning Platform (MSPP) of the core network. Each VLAN communicates traffic with a corresponding MSPP utilizing Ethernet over a plurality of Ethernet interfaces. The MSPP interfaces the VLANs with the core network based, in part, on the plurality of Ethernet interfaces.

16 Claims, 13 Drawing Sheets

U.S. PATENT DOCUMENTS

| | | |
|---|---|---|
| 2004/0170713 A1 | 9/2004 | Pan et al. |
| 2004/0174887 A1 | 9/2004 | Lee .................... 370/395.53 |
| 2005/0053079 A1 | 3/2005 | Havala et al. |
| 2005/0265329 A1 | 12/2005 | Havala et al. |
| 2005/0265355 A1 | 12/2005 | Havala et al. |

OTHER PUBLICATIONS

Lee et al., "End to End QoS Architecture for VPNs: MPLS VPN Development in a Backbone Network,", Electronics and Telecommunications Research Institute, IEEE 2000, pp. 479-483.

European Search Report in European Patent Application No. EP 04 02 0905, Jan. 4, 2005, 2 pages.

Jamieson et al., "MPLS VPN Architecture," Nortel Telecom Ltd., Aug. 7, 1998, 16 pages.

Rosen et al., "BGP/MPLS VPN's," Cisco Systems, Inc., Mar. 1999, 25 pages.

Vivace Networks, "Delivering Ethernet Traffic in MAN/WAN, Practical Ways to Offer Managed Ethernet Services," 2001, pp. 1-19.

Hama et al., U.S. Appl. No. 09/805,868, "Network and Edge Router," Filed Mar. 14, 2001, 51 pages, 25 drawings.

\* cited by examiner

| ETHERNET INTERFACE | VPN LABEL |
|---|---|
| L | M |
| L+1 | M+1 |
| ⋮ | ⋮ |
| L' | M' |

124

| VPN LABEL | VLAN ID (VID) |
|---|---|
| M | N |
| M+1 | N+1 |
| ⋮ | ⋮ |
| M' | N' |

124A

FIG. 8A (a) L2 VPN LABEL TABLE OF MSPP A — 124

| PE A #VPN IDENTIFIER | | | LABEL TABLE OF ENTERPRISE A | |
|---|---|---|---|---|
| VPN LABEL | L2 ADDRESS | OUTGOING I/F | VLAN ID (VID) | VPNi |
| 26 | | | 101 | COMPANY-A |

VLAN ID AND VPN IDENTIFIER ENTERED STATICALLY WHEN VPN/VLAN IS SET UP (b) L2 VPN ROUTING TABLE OF MSPP A

| PE A #VPN IDENTIFIER | ROUTING TABLE OF ENTERPRISE A |
|---|---|
| | |
| | |
| | |

125

FIG. 8B (a) L2 VPN LABEL TABLE OF MSPP A — 124

| PE A #VPN IDENTIFIER | | | LABEL TABLE OF ENTERPRISE A | |
|---|---|---|---|---|
| VPN LABEL | L2 ADDRESS | OUTGOING I/F | VLAN ID (VID) | VPNi |
| 26 | MACA | ETHERNET 0 | 101 | COMPANY-A |

(b) L2 VPN ROUTING TABLE OF MSPP A

| PE A #VPN IDENTIFIER | ROUTING TABLE OF ENTERPRISE A |
|---|---|
| | LOOPBACK ADDRESS OF L2 MAC B VIA PE B; VLAN 152 |
| | LOOPBACK ADDRESS OF L2 MAC C VIA PE C; VLAN 1501 |
| | L2 MAC A IS DIRECTLY CONNECTED, ETHERNET0, VLAN 101 |

SET UP BY iBGP { first two rows }

DIRECT CONNECT BECAUSE CPE IS DIRECTLY CONNECTED TO OWN MSPP

125

*FIG. 11A*
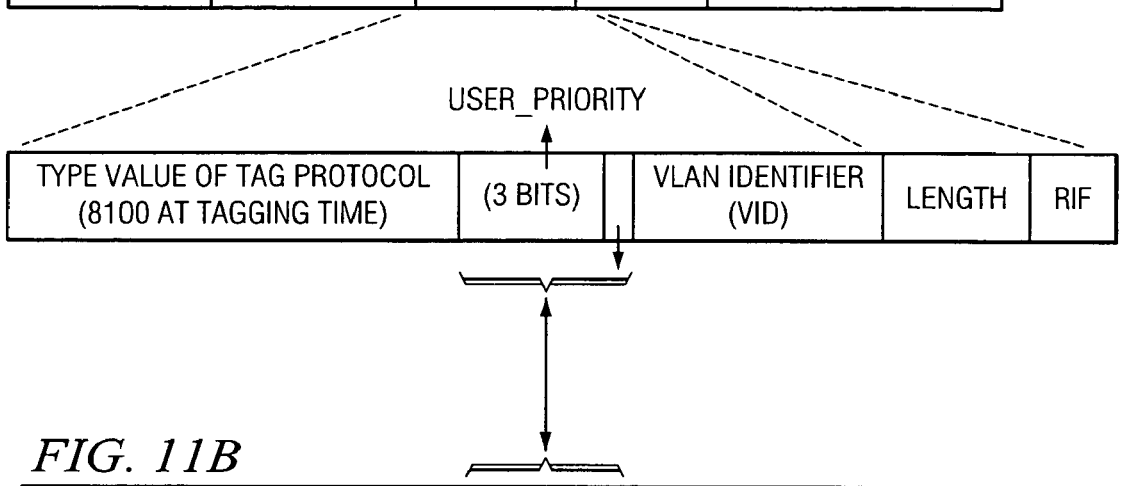
*FIG. 11B*
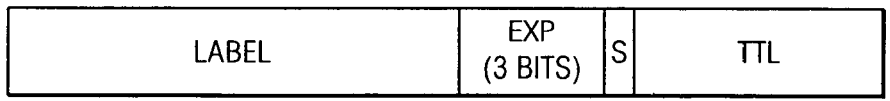
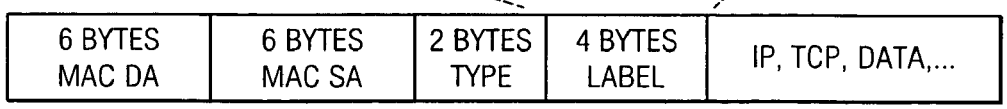

APPLICATION OF AN ETHERNET/MPLS HALF BRIDGE TO PROVIDE ETHERNET MULTIPLEXING FUNCTIONS (EMF) IN SONET NETWORK ELEMENTS (NES)

TECHNICAL FIELD

The present invention relates generally to communication networks, and more particularly to an application of an Ethernet/MPLS half bridge to provide Ethernet multiplexing functions (EMF) in SONET network elements (NEs).

BACKGROUND

Virtual Private Networks (VPNs) are used to interconnect geographically remote offices, campuses, factories, research labs and other factories of an Enterprise Across a shared network. This shared network may be a wide-area network (WAN) such as the Internet. The VPN may include a Multiservice Provisioning Platforms (MSPPs), a WAN router and a VPN-dedicated device at each geographic site. VPNs may utilize a Virtual Local Area Network (VLAN), a multiprotocol label switching (MPLS) over SONET network or other network.

VLANs group network—connected devices without relation to their physical wiring and constructions. The sending and receiving of frames is performed within the same group and the broadcasting of frames also takes place within the same group. Communication with a different VLAN group generally uses the intermediary of a router.

MPLS provides a virtual communication path in an Internet Protocol (IP WAN), which may include a SONET network. In particular, MPLS adds a label onto an IP packet that identifies a connection. The network router transmits the IP packet by popping, pushing or swapping the value of the label. In this way, an IP connection-type service is provided. However, the MPLS standards do not address integration of all aspects of MPLS switching into a SONET network.

SUMMARY

A system and method for providing an application of an Ethernet/MPLS half bridge to provide Ethernet multiplexing functions (EMF) in SONET network elements (NEs). In one embodiment, a virtual private network includes a core network. The core network includes a SONET over shared label switching network. A plurality of Virtual Local Access Networks (VLANs) are each coupled to a Multiservice Provisioning Platform (MSPP) of the core network. Each VLAN communicates traffic with a corresponding MSPP utilizing Ethernet over a plurality of Ethernet interfaces. The MSPP interfaces the VLANs with the core network based, in part, on the plurality of Ethernet interfaces.

Technical advantages of one or more embodiments may include providing an MPLS/SONET network to emulate a LAN as compared to a switch/bridge. In this case the MPLS/SONET network passes complex bridging control protocols transparently, so this implementation dramatically reduces complexity and simplifies interoperability. The cost of ownership may be significantly lowered. Yet other technical advantages may include an ability to cross an arbitrary number of SONET rings and may provide efficient support of point-to-point, multipoint services. Still yet other technical advantages may be Quality of Service (QoS) options per customer port and/or VLAN. Additional technical advantages may include the ability to perform service multiplexing—the ability to provide Ethernet service attributes based on the customer-assigned VID in each Ethernet VLAN frame.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

FIGS. 8A-B illustrate one embodiment of the VPN tables of FIG. 9;

FIGS. 11A-B illustrate one embodiment of correspondence between user priority and a VLAN and IP precedence and MPLS/SONET;

DETAILED DESCRIPTION OF THE DRAWINGS

Figure 1:
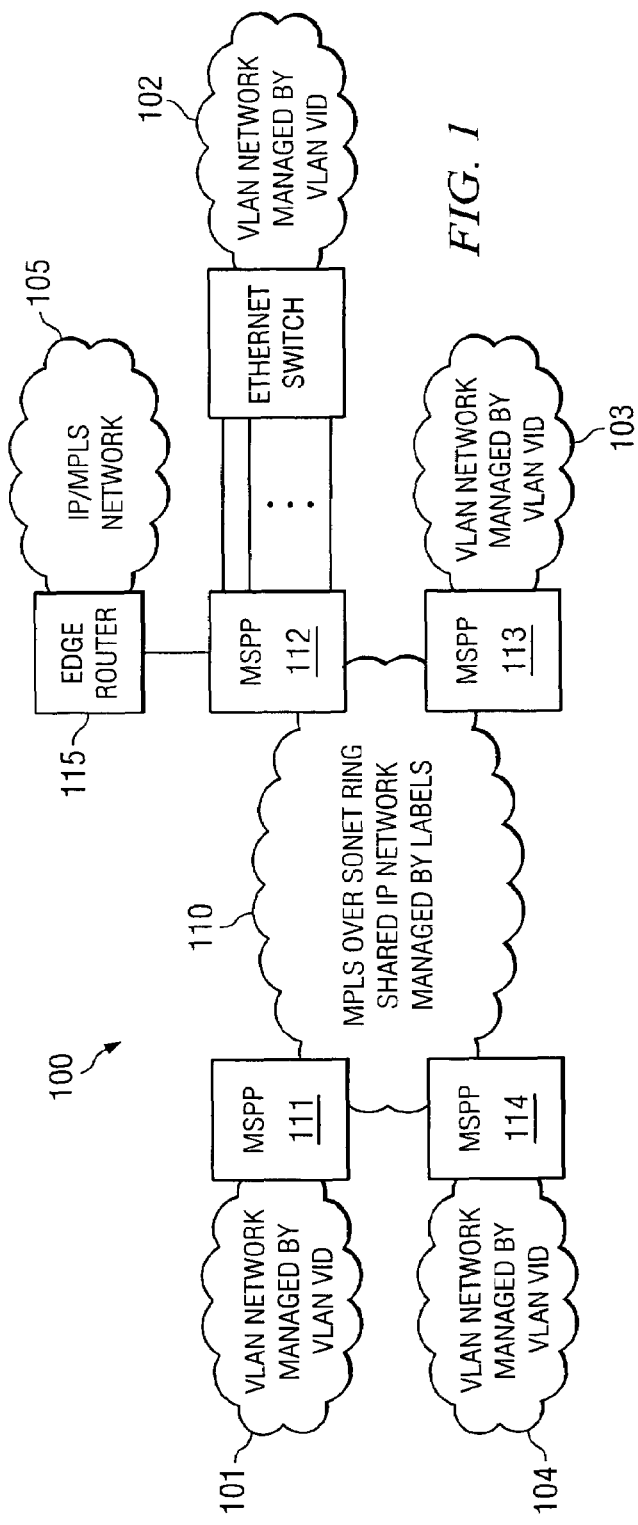
FIG. 1 illustrates one embodiment of virtual local area networks (VLANs) with access to a shared label switching over SONET network.

FIG. 1 illustrates one embodiment of a shared label switching over SONET system 100. At a high level, system 100 includes a shared label switching over SONET network 110 coupled to virtual local area networks (VLANs) 101-104 and a disparate shared label switching network 105 to form a plurality of virtual private networks (VPNs) and provide Ethernet Multiplexing Functions (EMF). In this embodiment, the VPNs are Layer-2 (L2) VPNs. Layer-3 or other layer VPN could be used. In this embodiment, each shared label switching over SONET network is a multiprotocol label switching over SONET (MPLS/SONET) network. MPLS provides a path (a virtual communication path) into an IP network. It will be understood that the shared network may comprise other label switching networks, Internet Protocol (IP) networks or other suitable networks with tunneling or other functionality to support geographically distributed VPNs and/or EMF. For example, non-IP such as IPX, FNA, AppleTalk and the like may be implemented.

Referring to FIG. 1, a mixed network comprises a shared MPLS network 110, VLANs 101-104 and a IP/IMPLS network 105. Schemes for implementing a VLAN include (1)

port-based VLAN, (2) MAC-address based database VLAN and (3) policy-based VLAN. An MPLS/SONET network may comprise Label Switching Routing (LSRs). As described in more detail below, the VLANs 101-104 are managed by prescribed VLAN IDs (VIDs). Each VID may be associated with a VPN, such as a L3 or L2 VPN, or, alternatively, a network service such as, for example, Internet, Voice-over-IP (VoIP), or other suitable services. The shared MPLS/SONET network 110 is managed by labels and may be constructed on the Internet or other Wide Area Network (WAN). The edges of the MPLS network 110 are provided with Multiservice Provisioning Platforms (MSPPs) 111-114. MSPPs 111-114 may be any suitable device within or connected to the shared core network and operable to interface between a VLAN 101-104 (or other suitable LAN) and the shared core network 110 and to switch, route, direct, bridge, convert or otherwise process and/or send traffic. Additionally, MSPPs 111-114 may be operable to interface between a IP/MPLS network and the Shared core network 110. For example, MSPPs 111-114 may comprise Label Edge Routers (LERs). As used herein, send means to forward, allow or initiate forwarding or sending, transmitting or otherwise directing.

Each MSPP 111-114 converts ingress packets, such as VLAN packets from the VLANs 101-104 or IP packets from network 105, to MPLS packets and transmits the MPLS packets over one or more SONET paths in the MPLS/SONET network 110. Each MSPP 111-114 is further operable to convert MPLS packets to egress VLAN packets or IP packets and output the packets to prescribed VLANs or to disparate MPLS network respectively.

In a particular embodiment, as described in more detail below, each MSPP 111-114 finds a VPN label, which is a VPN identifier associated within an ingress Ethernet interface of a VLAN packet, finds a forwarding label, for forwarding the packet along a prescribed route on the basis of the destination of the VLAN packet, impose these labels to generate an MPLS packet, and sends the MPLS packet to the MPLS/SONET network 110 by mapping the MPLS packet into one or more SONET paths. As used herein, find means to look-up, determine, retrieve or otherwise become aware of. The MPLS/SONET network 110 routes the MPLS packet to the target MSPP 111-114 over a preset route while the forwarding label of the packet, if included, is replaced. In the illustrated embodiment, the preset route is based on the ingress Ethernet interface, such as the ingress port. Upon receiving the MPLS packet from the MPLS/SONET network 110, a MSPP 111-114 receiving the MPLS packet removes any included forwarding label, converts the VPN label to a VID, adds the VID to the packet in place of the label to generate a VLAN packet and sends the VLAN packet to the VLAN 101-104 indicated by the VID. In the case where MSPP 100 sends VLAN packets that originated in VLANs 101, 103, or 104 to VLAN 102, system 100 provides EMF. Or, alternatively, MSPP 111-114 may additionally convert the VLAN packet to an MPLS packet for transmission through a disparate MPLS network such as, for example, IP/MPLS network 105. In this embodiment, system 100 provides service multiplexing. A packet can be transmitted from a VLAN 101-104 transmitting a packet belonging to a certain VPN to a disparate VLAN 101-104 (or IP/MPLS network 105) receiving the packet and belonging to the same VPN. As mentioned above, after the VID is added to the packet in place of the VPN label, MSPP 111-114 may generate a MPLS packet for transmission over a disparate MPLS/SONET network, such as network 105. In this case, if the VID is not associated with VLAN 102, then MSPP 112 generates a MPLS packet and sends it to network 105 via edge router 115.

The VLANs 101-104 are each connected to MPLS/SONET network 110 by Ethernet interfaces. As used herein, each means every one of at least a subset of the identified items. SONET means Synchronous Optical Networks including Synchronous Signal Digital Hierarchy (SDH) networks. To support EMF/SONET, the network elements of each VLAN 101-104 or network 105 may include MSPPs 111-114 which map Ethernet services over one or more SONET paths.

A SONET path or a virtual concatenation of SONET paths provides a point-to-point tunnel. Traditional SONET paths include STS-1 (51.84 Mbps), STS-Nc (e.g., 622.08 Mbps for STS-12c) and VT1.5 (1.728 Mbps) paths. Virtual concatenation combines a number of SONET paths (e.g., 5 STS-3c, virtually concatenated into STS-3c-5v) to present a single payload to the EoS adaptation layer. Virtual concatenation provides additional bandwidth granularity for tunnels (i.e., at integer multiples of traditional SONET rates) in a manner that is transparent to the SONET network as virtual concatenation is visible only to SONET path terminating elements and the SONET network operates at the SONET section and line layers.

In the mixed network, edge network elements of the VLANs 101-104 and of the MPLS/SONET network 110 includes SONET interfaces that support physical layer channelization in which Synchronous Transport Signal (STS) or Virtual Tributary (VT) paths are multiplexed onto a single physical interface.

Figure 2:
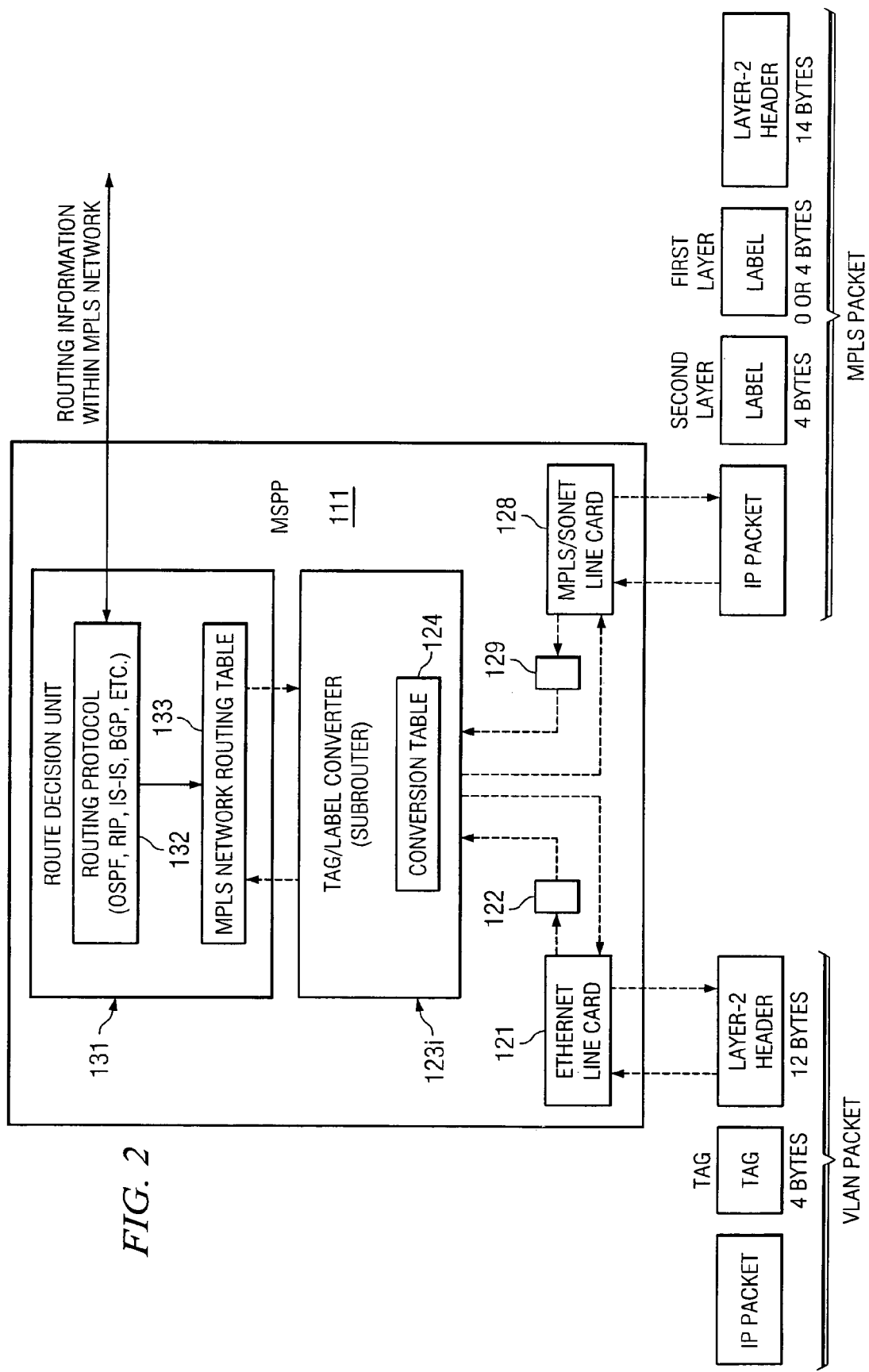
FIG. 2 illustrates one embodiment of a Multiservice Provisioning Platform (MSPP) of FIG. 1.

FIG. 2 illustrates one embodiment of MSPP 111 of FIG. 1. The other MSPPs may be identically or similarly constructed. MSPP 111 may be otherwise suitably constructed with disparate elements and/or with its functionality otherwise distributed or combined. The functionality of MSPP 111 and other components of the network may be performed by logic and encoded in media. The logic may be hardware or software based.

Figures 5A, 5B, 6:
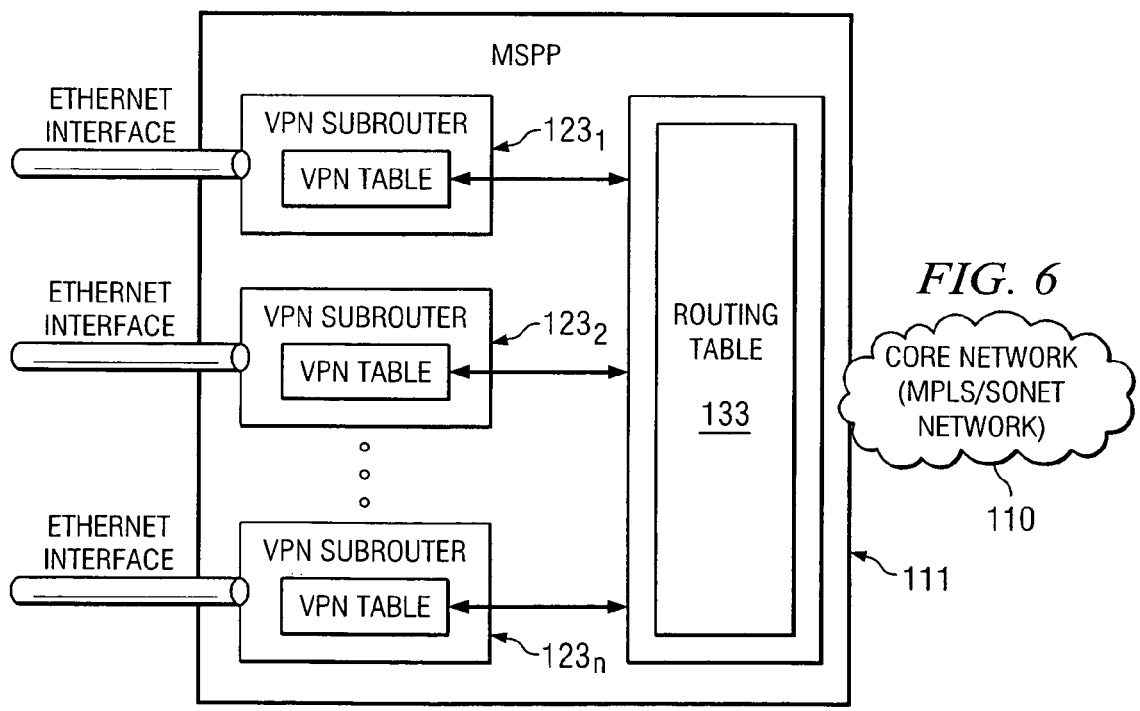
FIG. 5A illustrate one embodiment of conversion tables of the subrouter of FIG. 2.
FIG. 5B illustrate one embodiment of conversion tables of the subrouter of FIG. 3.
FIG. 6 illustrates one embodiment of the Ethernet line card of FIG. 2.

Referring to FIG. 2, MSPP 111 has one or more Ethernet line cards 121 equipped with an Ethernet interface function for receiving a VLAN packet from a certain VLAN. Each Ethernet line card 121 may be associated with a separate VPN identification unit 122. Alternatively, a single VPN identification unit 122 may be associated with the plurality or all of the Ethernet line cards 121 of the MSPP 111. The VPN identification unit 122 identifies, in one embodiment, a VPN by referring to the ingress Ethernet interface and inputs the packet to a tag/label converter (subrouter) $123i$ ($i=1, 2, \ldots$) that corresponds to the VPN. The subrouter $123i$ corresponding to the identified VPN has a conversion table 124 which, in one embodiment, sorts the correspondence between (1) Ethernet interfaces and (2) VPN identifiers (VPN labels) that specify VPNs to which the VLAN packet belongs. Details of the conversion table 124 are illustrated in FIG. 5A.

MSPP 111 may further include a route decision unit 131 for deciding beforehand a route to a MSPP 111-114 receiving an MPLS packet using a routing protocol 132 and storing in a MPLS/SONET network routing table (forwarding-memory) 133 a forwarding label and an egress interface. The egress interface may include a SONET path and an outgoing interface. The forwarding label may comprise a null forwarding label or an IP forwarding label (a push label). The null forwarding label has 0 bytes and is included when the egress interface provides sufficient context for a corresponding VPN. In one embodiment, MSPP 111 comprises a half bridge. As used herein, a half bridge is any software, hardware, or firmware operable to only replicate data toward MPLS/SONET network 110, only learns layer 2 address information from the MPLS/SONET network 110, and performs split horizon forwarding (i.e., does not forward data received from the MPLS/SONET network 110 back to the MPLS/SONET network 110). In this embodiment, MPLS/SONET network 110 emulates Ethernet LAN functions and thus does not participate in the Ethernet switch control plane, thereby passing Ethernet switch control traffic transparently. In so doing, MPLS/SONET network 110 eliminates redundant bridging functions.

Each MPLS/SONET line card 128 is coupled to route decision unit 131 and MPLS/SONET network 110. MPLS/SONET line card 128 is operable to receive an MPLS packet from route decision unit 131 and communicate an MPLS packet to MPLS/SONET network 110 by mapping the MPLS packet into one or more SONET paths. For conversion from MPLS/SONET packet to VLAN packet, each MPLS/SONET line card 128 may be associated with a VLAN identification unit 129. The VLAN identification unit 129 identifies, in one embodiment, a VPN by referring to the VPN label of the received MPLS packet and inputs the packet to subrouter 123$i$ corresponding to the VPN. Line card 128 may be any software, hardware, or firmware operable to map an MPLS packet into a one or more SONET paths, using methods that include, but not limited to, SONET virtual concatenation.

In one aspect of operation, Ethernet line card 121 receives a VLAN packet from VLAN 101 over an ingress Ethernet interface which passes the received VLAN to VPN identification unit 122. VPN identification unit identifies the VPN by reference to the Ethernet interface and inputs the VLAN packet to the subrouter 123$i$ corresponding to the identified VPN. Subrouter 123$i$ imposes a VPN label associated with the ingress Ethernet interface. Based upon the ingress Ethernet interface route decision unit 131 retrieves a forwarding label and egress interface associated with the ingress interface from forwarding memory 133. If the egress interface does not provide sufficient content for routing the packet through MPLS/SONET network 110, route decision unit 131 imposes a push label on layer 1. In either case, route decision unit 131 forwards the MPLS packet egress MPLS/SONET based line card 128. MPLS/SONET line card 128 maps a received MPLS packet into a SONET path for transmission of the MPLS packet over MPLS/SONET network 110.

Figure 3:
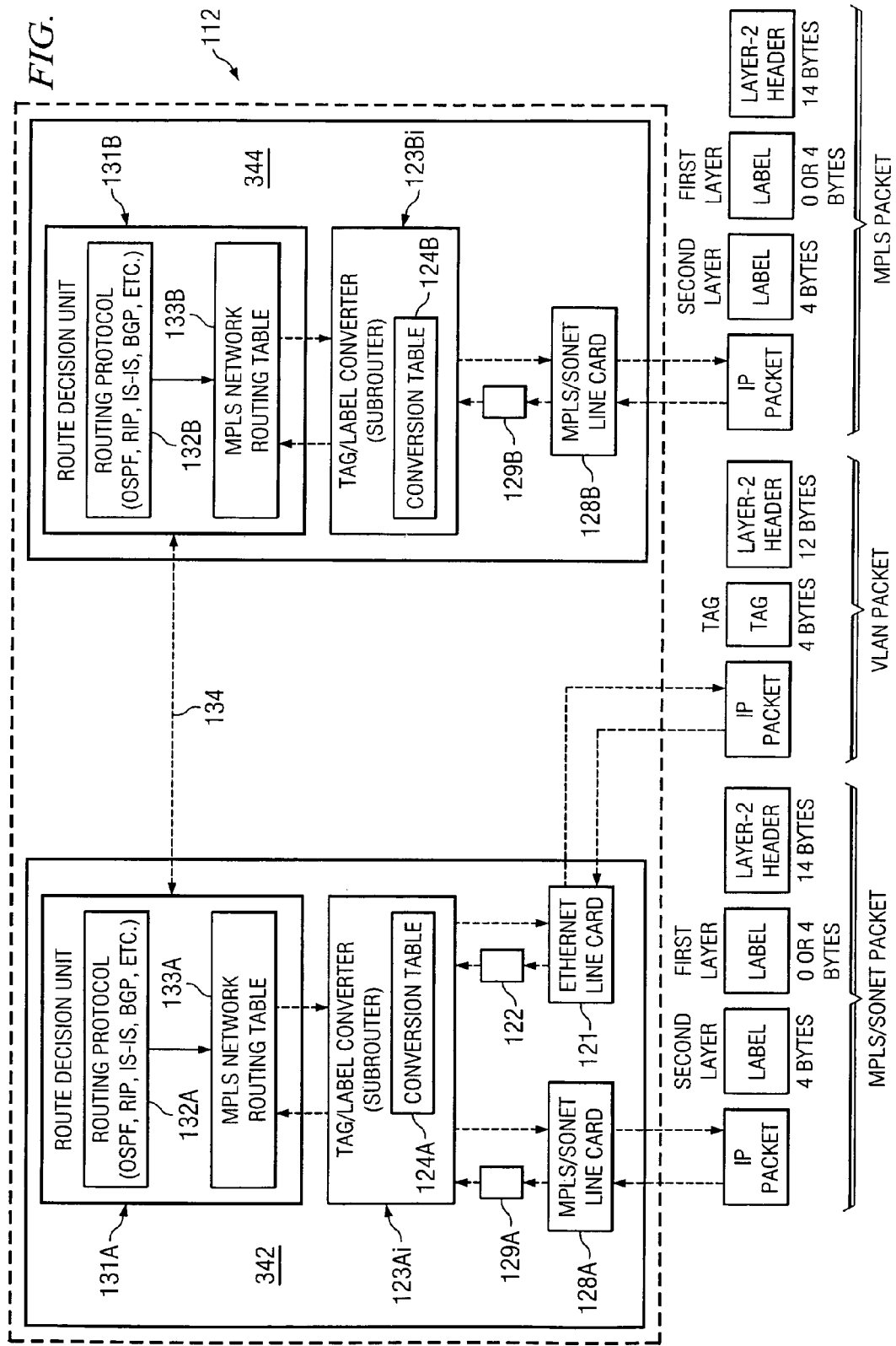
FIG. 3 illustrates another embodiment of an MSPP of FIG. 1

FIG. 3 illustrates one embodiment of MSPP 112 of FIG. 1. The other MSPPs may be identically or similarly constructed. MSPP 112 may be otherwise suitably constructed with disparate elements and/or with its functionality otherwise distributed or combined. The functionality of MSPP 112 and other components of the network may be performed by logic and encoded in media. The logic may be hardware or software based.

Referring to FIG. 3, MSPP 112 includes a first half bridge 342 and a second half bridge 344. In general, the first half bridge 342 receives MPLS packets from MPLS/SONET network 110 via MPLS/SONET line card 128A and generates a VLAN packet based, in part, on the ingress Ethernet interface which may be forwarded to VLAN 102 or second half bridge 344. The second half bridge 344 receives the generated VLAN packet and generates an MPLS packet for transmission over MPLS/SONET network 105 via MPLS/SONET line card 128B. The first half bridge 342 converts based on the ingress Ethernet interface between MPLS packets and VLAN packets and thus includes analogous features and functions of MSPP 111 illustrated in FIG. 2. In this case, any included forwarding label is removed. Accordingly, the description of MSPP 111 above analogously applies to the first half bridge 342 and Ethernet line card 121.

The first half bridge 342 has one or more MPLS/SONET line card 128 is equipped with a SONET interface function for receiving a MPLS packet from MPLS/SONET network 110. Each MPLS/SONET line card 128 may be associated with a VLAN identification unit 129. Alternatively, a single VLAN identification unit 129 may be associated with a plurality or all of the MPLS/SONET line cards 128, coupled to route decision unit 131 and MPLS/SONET network 110. The VLAN identification unit 129 identifies, in one embodiment, a VPN by referring to the VPN label of the received MPLS packet and inputs the packet to subrouter 123Ai corresponding to the VPN. The subrouter 123Ai corresponding to the identified VPN has a conversion table 124 which, in one embodiment, sorts the correspondence between (1) VLAN IDs (VIDs) and (2) VPN identifiers (VPN labels) that specify VPNs to which the VLANs specified by the VIDs belong and switches between the VPN label and VID. In this embodiment, both the VID and VPN labels are associated with the ingress Ethernet interface and these VIDs will be referred to as outer VIDs as compared with the VID included in the original VLAN packet. The VID included in the original VLAN packet will be referred to as the inner VID. Details of the conversion table 124 are illustrated in FIG. 5B.

The first half bridge includes may further include a route decision unit 131A that provides the forwarding label and egress interface for transmission through MPLS/SONET network 110 and thus includes the same features and functions of MSPP 111 as described above. In the case of a MPLS packet received from MPLS/SONET network 110, route decision unit 131A determines an ingress interface for the VLAN packet constructed from the MPLS packet. In one embodiment, if the combined inner and outer VIDs of a VLAN packet are identified, then the VLAN packet is forward to the second half bridge 344 via an internal interface 134, for conversion to an MPLS packet for transmission over MPLS network 105. Otherwise, route decision unit 131A forwards the VLAN packet to Ethernet line card 121.

The second half bridge includes route decision unit 131B, subrouter 123Bi, and VPN identification unit 129. The one or more MPLS/SONET line cards 128B is equipped with a SONET interface function for transmitting receiving MPLS packets to and from MPLS/SONET network 105. Each MPLS/SONET line cards 128B may be associated with a separate VPN identification unit 129. Alternatively, a single VPN identification unit 129 may be associated with the plurality or all of MPLS/SONET line cards 128B of the MSPP 112. The VPN identification unit 129 identifies, in one embodiment, a VPN that extends between networks 105 and 110 by referring to the VPN label of the received MPLS packet and inputs the packet to a tag/label converter (subrouter) 123Bi ($i=1, 2, \ldots$) that corresponds to the VPN. The subrouter 123Bi corresponding to the identified VPN has a conversion table 124B which, in one embodiment, sorts the correspondence between (1) outer VIDs and (2) VPN labels that specify VPNs associated with an Ethernet interface. Details of the conversion table 124B are illustrated in FIG. 5B.

Route decision unit 131B decides beforehand a route to a MSPP of network 105 receiving an MPLS packet using a routing protocol 132B based on an associated inner and outer VIDs and storing in a forwarding-memory 133B a forwarding label and an egress interface. The egress interface may include a SONET path and an outgoing interface. The forwarding label may comprise a null forwarding label or a push label. The null forwarding label has 0 bytes and is included when the egress interface provides sufficient context for a corresponding VPN. After imposing any forwarding label, the MPLS packet are forwarded to the appropriate egress interface, i.e., MPLS/SONET line card 128B. MPLS/SONET line cared 128B communicates the packet to network 105 by mapping the MPLS packet on to a SONET path.

MPLS/SONET line card 128 is operable to receive an MPLS packet from route decision unit 131 and communicate an MPLS packet to an MPLS/SONET network 105 by mapping the MPLS packet into a SONET path. Line card 128 may be any software, hardware, or firmware operable to map an MPLS packet into one or more SONET paths, a forwarding label (a push label), which specifies the decided route, in an MPLS network routing table (forwarding-memory) 133 in correspondence with the IP address of the receiving MSPP.

In one aspect of operation, MSPP 112 receives a packet from MPLS/SONET network 110. The received MPLS packet is received by MPLS/SONET line card 128 and VPN identification unit 129A. VPN identification unit 129A identifies the associated VPN and forwards the MPLS packet to the appropriate subrouter 123Ai. Subrouter 123Ai removes the VPN label and adds an outer tag including an outer VID associated with the ingress Ethernet Interface. As a result, the packet now includes an inner and an outer VID. After adding the outer VID, subrouter 123Ai forwards the packet to route decision unit 131A that removes any forwarding label and determines whether the combined inner and outer VID are recognized for determining an egress interface. If the combination is not recognized, the VLAN packet is forward to Ethernet line card 121. If recognized, the VLAN packet is forwarded to the second half bridge 344 for conversion to an MPLS packet. Based on the outer VID, route decision unit 131B forwards the VLAN packet to a subrouter 123Bi associated with the outer VID. Subrouter 123Bi converts the VID to VPN label where both are associated with the ingress Ethernet interface. Once converted, the packet is then forwarded to route decision unit 131B for determining a forwarding label and egress interface. Route decision unit 131B imposes the forwarding label and forwards the MPLS packet to MPLS/SONET line card 128B for mapping onto one or more SONET paths.

Figure 4:
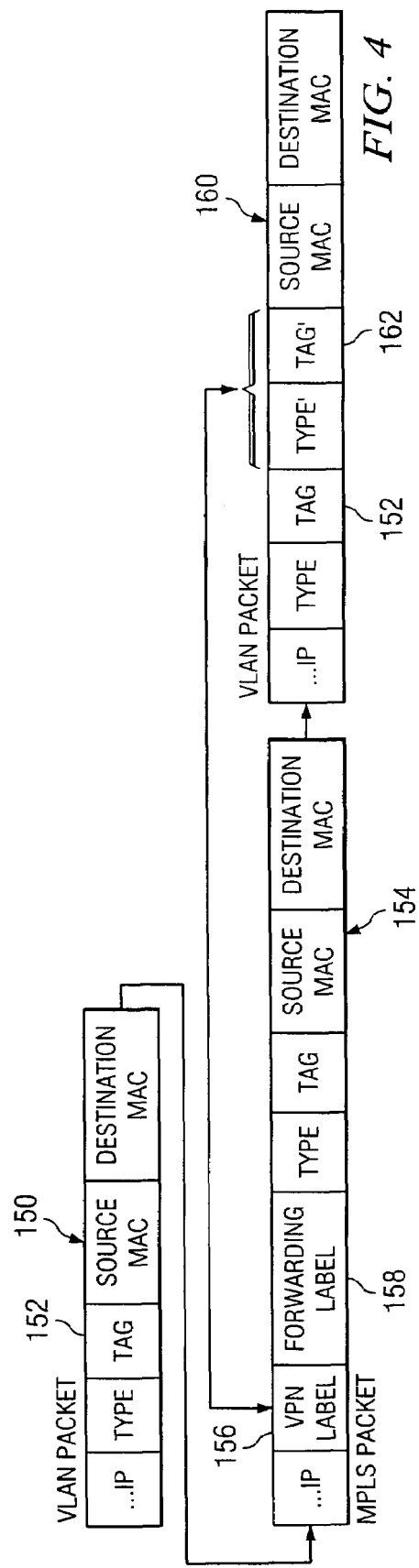
FIG. 4 illustrates one embodiment of conversion of a VLAN packet to a MPLS packet to a VLAN packet in the network of FIG. 1.

FIG. 4 illustrates one embodiment of conversion of a VLAN packet to an MPLS packet and to VLAN packet. As used in herein, conversion means to swap, translate, transition or otherwise modify addressing information in a packet. In this embodiment, a VPN label and a forwarding label are added to a VLAN packet to generate the MPLS packet. The VLAN packet may be otherwise suitably converted to an MPLS or other label switching packet. Once received by a destination MSPP, the VPN label is swapped for an outer tag and the forwarding label is removed.

Referring to FIG. 4, when a VLAN packet 150 enter, the subrouter 123i of, for example, MSPP 111 refers to conversion table 124 to find the VPN identifier (VPN label) 156 corresponding to the ingress Ethernet interface. Route decision unit 131 finds the receiving MSPP 111-114 based upon the ingress Ethernet interface and finds, if appropriate, forwarding label 158, which has been stored in correspondence with the ingress Ethernet interface, from the MPLS network routing table 133.

Subrouter 123i inserts VPN label 156 and route decision unit 131 inserts forwarding label 158 into VLAN packet 150 to generate MPLS packet 154. MPLS packet 154 is sent to MPLS network 110 via MPLS/SONET line card 128. MPLS/SONET line card 128 may be equipped with an MPLS over SONET interface function for receiving a MPLS packet from route decision unit 131 and mapping the received MPLS packet into one or more SONET paths. MPLS/SONET network 110 routes MPLS packet 154 to the target MSPP 114 over the preset route while replacing, where appropriate, forwarding label 158. MPLS/SONET line card 128 of the receiving MSPP 111-114 receives an MPLS packet 154 from MPLS/SONET network 110 the MPLS/SONET line card 128 converts the received MPLS packet to a VLAN packet 160. The VPN identification unit 129A identifies the VPN by referring to VPN label 156 of MPLS packet 154 and inputs the packet to the subrouter 123i (i=1, 2, ...) that corresponds to the VPN.

Subrouter 123i refers to conversion table 124 to find the outer VID that corresponds to VPN label 156. Subrouter 123i then generates a VLAN packet 160 by adding an outer tag 162, which includes the VID found, in place of the VPN label 156. If route decision unit 131A does not identify the combined inner and outer VID, then route decision unit 131A forwards VLAN packet 160 to Ethernet line card 121 for transmission over VLAN 102. If the combination is identified, route decision unit 131A forwards VLAN packet 160 to the second half bridge 344. The second half bridge generates an MPLS packet for transmission over MPLS/SONET network 105, as discussed above. It should be noted that the contents of table 124 are not the same in each MSPP 111-114 and that the VID values of VLANs that belong to the same VPN are not necessarily the same. Further, though not shown clearly in FIG. 2, a subrouter may exist for every VPN, as illustrated in FIG. 6.

Thus, for example, when communication is initiated from VLAN 101 to VLAN 102 in FIG. 1, label 156 is imposed by VLAN 111 and label 156 and tag 162 are swapped by MSPP 112 in the manner shown in FIG. 4. As a result, VLAN packet 150 that enters from VLAN 101 side is changed to an MPLS packet 154 by MSPP 111, MPLS packet 154 is transmitted through MPLS/SONET network 110 and is converted to a VLAN packet 160 by MSPP 112, and this VLAN packet is then transmitted to a VLAN 102 belonging to a VPN identical with that on the transmit side.

FIG. 6 illustrates one embodiment of Ethernet line card 121 of FIG. 2. In this embodiment, an Ethernet interface is provided for each Ethernet channel. The Ethernet line card 121 may be otherwise suitably configured in its functionality otherwise distributed or otherwise distributed or combined. Referring to FIG. 6, Ethernet line card 121 includes a plurality of Ethernet interfaces, where each interface carries at least one Ethernet channel. In this embodiment, each Ethernet interface need not be coupled to a corresponding VPN identification unit 122.

In operation, an Ethernet channel is received by an ingress Ethernet interface. The ingress Ethernet interface forwards each channel directly to a corresponding subrouter 123i for connection. For egress traffic from MSPP 111, subrouter 123i determines an outgoing interface (port) and sub-interface (channels) based on the egress interface provided by the subrouter 123i.

Figure 7A:
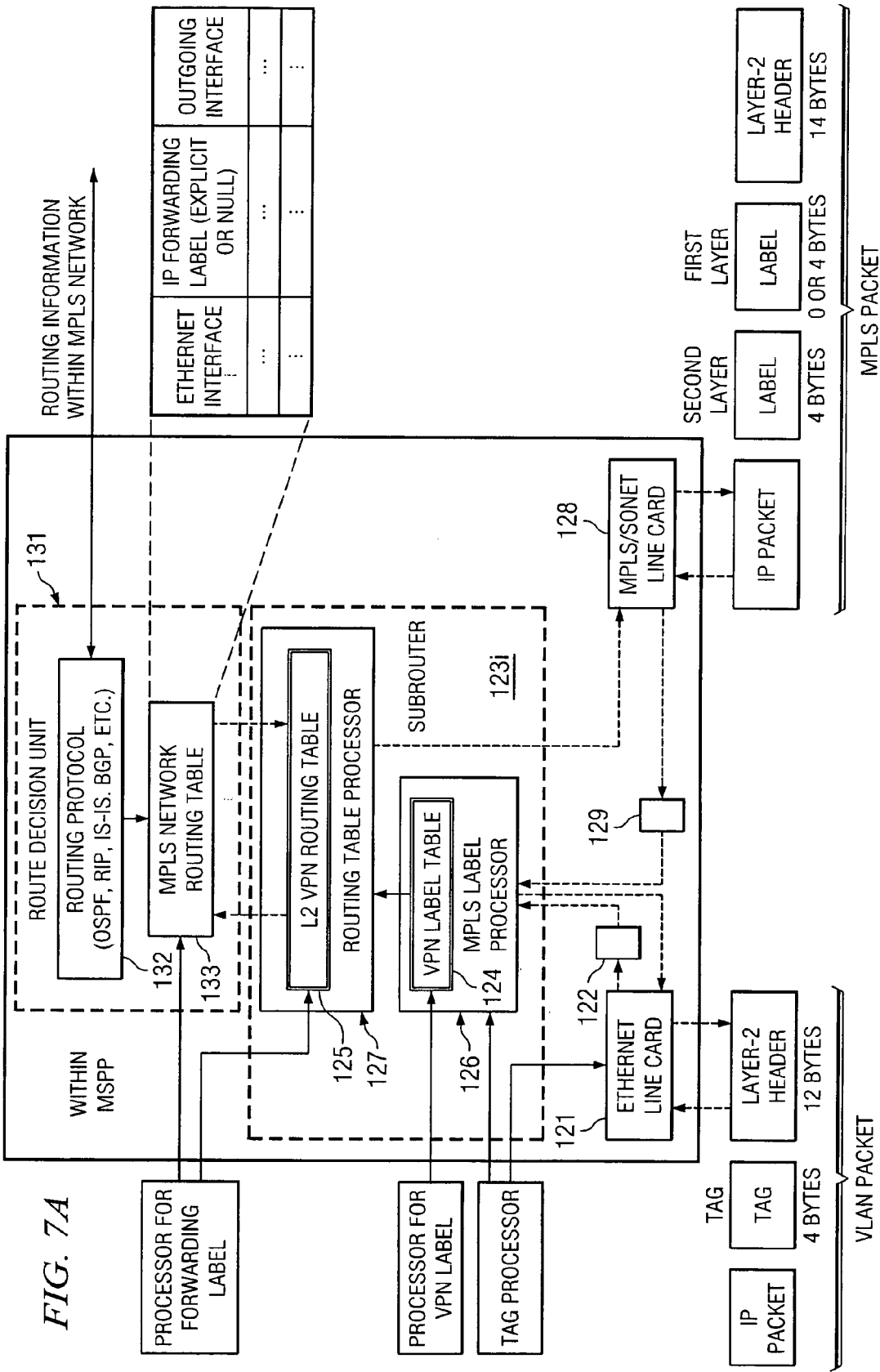
FIG. 7A illustrates one embodiment of the MSPP of FIG. 2.
Figures 1, 7B:
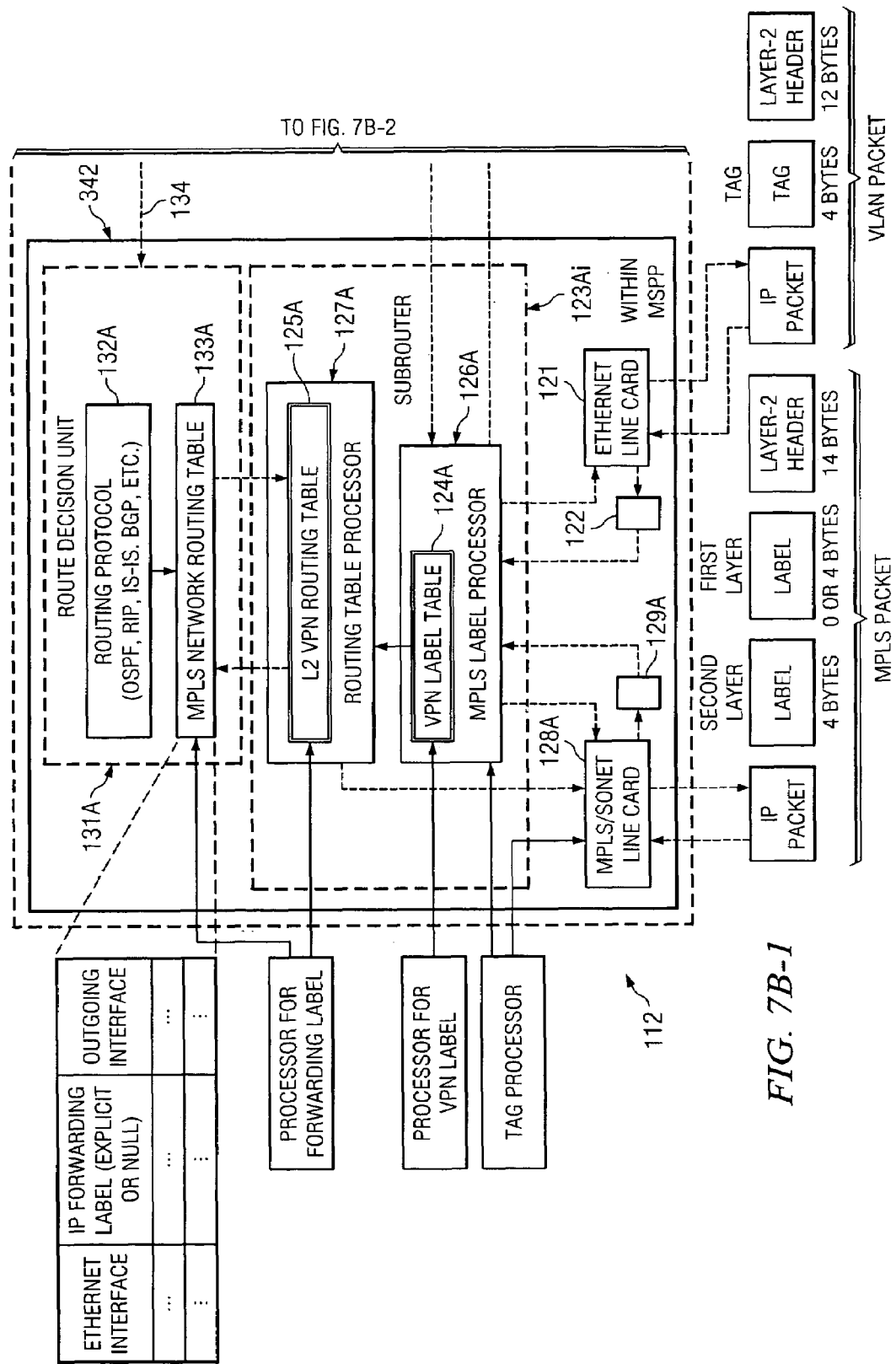
FIG. 7B illustrates one embodiment of the MSPP of FIG. 3.
Figures 2, 7B:
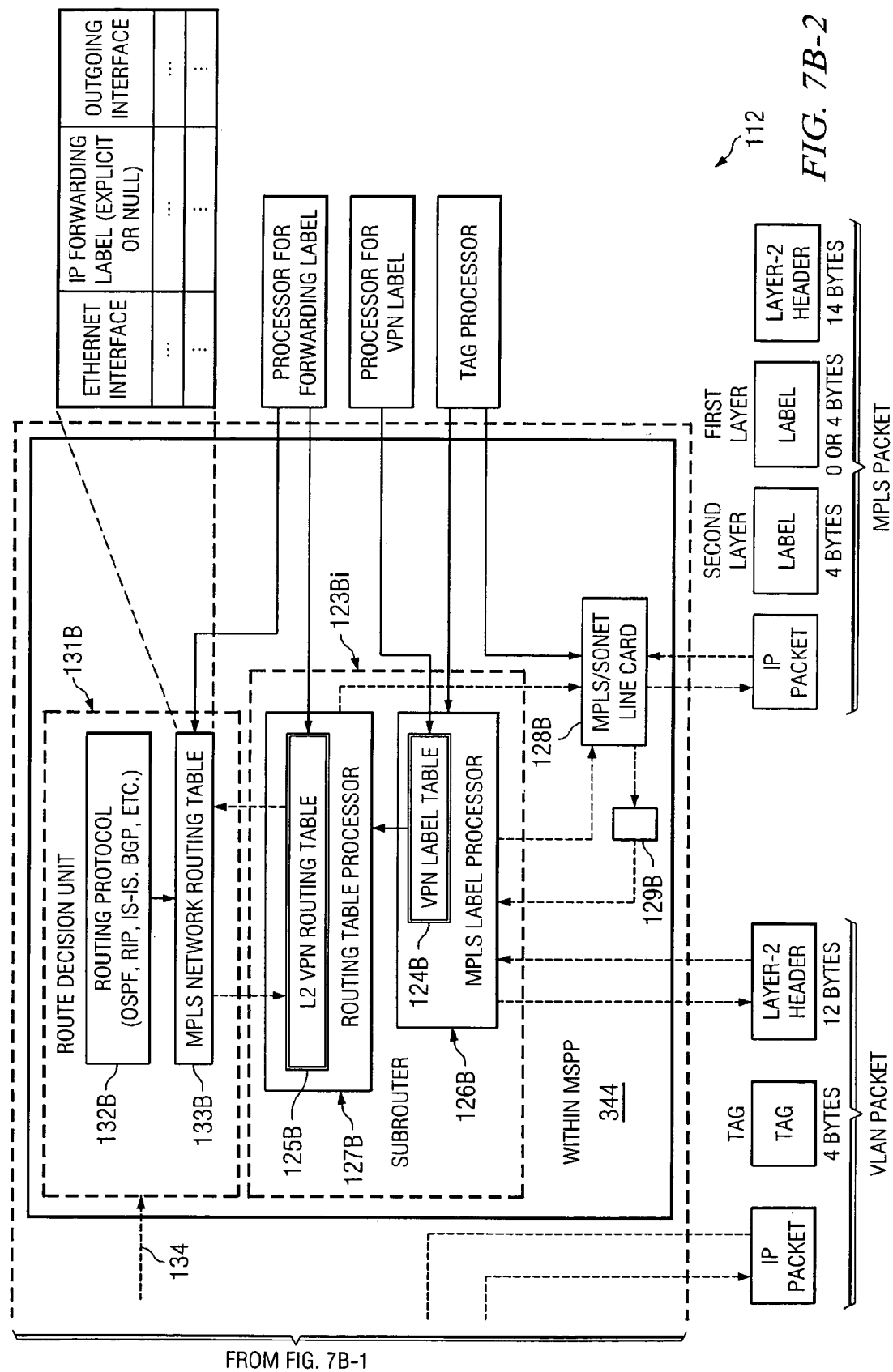

FIG. 7A-B illustrate one embodiment of MSPP 111 of FIG. 2 and MSPP 112 of FIG. 3, respectively. Components in FIG. 7A-B that are identical to those of FIGS. 2 and 3 are designated by like reference characters.

Ethernet line card 121, which has an Ethernet interface function, receives a VLAN packet from a prescribed VLAN 101-104. As previously described, the VLAN packet is received via Ethernet channels and forwarded to the corresponding VPN identification unit 122. The VPN identification unit 122 identifies the VPN either by referring to the VID or ingress Ethernet interface of the received VLAN packet and inputs the packet to the subrouter 123i that corresponds to this VPN. As shown in (a) of FIGS. 10A and 10B, the L2 label table 124 of the subrouter 123i stores, in one embodiment, the correspondence among (1) VPN labels (VPN identifiers), (2) L2 addresses (MAC addresses) of CPE routers under control, (3) output-side interfaces, (4) identifiers (VIDs) of VLANs connected to MSPPs, and (5) VPNi (VPN Instance): a convenient name for VPN identifier. The outgoing interface field may include a physical interface and one or more SONET paths.

FIG. 8A illustrates the initial state and FIG. 8B the state that results after various data have been set. A L2 VPN routing table 125, in one embodiment, stores (1) a L2 address (MAC address) of the CPE router within a VLAN, (2) a loopback address (IP address) of the MSPP to which the CPE router is connected, and (3) an identifier (VID) of the VLAN to which the CPE router belongs, as shown in (B) of FIGS. 8A and 8B.

The MPLS network routing table (forwarding-label memory) 133 stores forwarding labels which specify the route to the received MSPP 111-114 and egress interfaces. Using a routing protocol, the route decision unit for deciding the route within the MPLS/SONET network 200 searches for routes from the transmitting MSPP 111-114 to the receiving MSPP 111-114 and assigns a forwarding label and an egress interface to each route in accordance with the LDP (label distribution protocol) in such a manner that the VLANs belonging to the same VPN can communicate with one another. Accordingly, route decision unit 131 decides the route to the receiving MSPP 111-114 using routing protocol 132 and stores forwarding label 158 (push label), where appropriate, in SONET path, and outgoing interface, in the forwarding label table 133 in a form mapped to the loopback address (IP address) of the receiving MSPP 111-114.

If VPN label 156 and push label 158 have been found, subrouter 123i imposes VPN label 156 and forwarding label 158 to generate an MPLS packet 154, as shown in FIG. 4, and passes MPLS packet 154 to MPLS/SONET line card 128 to map MPLS packet 154 into one or more SONET paths. MPLS packet 154 arrives at the receiving MSPP 111-114 along the preset route through the MPLS/SONET network 110 while its forwarding label 158, if included, is replaced. MPLS/SONET line card 128 of the receiving MSPP 111-114, terminates the SONET path(s), receives the MPLS packet 154 from MPLS/SONET network 110, and passes a corresponding MPLS packet to VPN identification unit 129. VPN identification unit 129 identifies the VPN by referring to VPN label 156 of MPLS packet 154 and inputs packet 154 to the subrouter 123i (i=1, 2, ...) corresponding to the VPN and the SONET path(s) over which MPLS packet 154 was received. Subrouter 123i removes the forwarding label 158, if included, and refers to the VPN label table 124 to find the VID corresponding to VPN label 156. Subrouter 123i then swaps tag 162, which contains the VID, for VPN label 156 to thereby generate a VLAN packet 160 and sends this VLAN packet 150 via line card 121 to the VLAN if the combined inner and outer VIDs are not identified. Alternatively, the VLAN packet may be forwarded to a second half bridge 344 for conversion to an MPLS packet destined for a disparate MPLS/SONET network if the combined inner and outer VIDs are identified. It should be noted that the VPN label tables 124 and MSPPs 111-114 are not identical in content and that the VID values of VLANs that belong to the same VPN are not necessarily the same. Further, though not shown clearly in FIG. 7A-B, subrouter 123i (i=1, 2, ...) and forwarding label table 123 may exist per every VPN. In order to arrange it so that VLANs belonging to a VPN can communicate with each other, a route is established beforehand between MSPPs 111-114 to which these VLANs are connected to and forwarding labels and egress interfaces are stored in forwarding label table 133 (FIG. 7A-B) of the router along the route, and the VPN label table 124 and L2 VPN routing table 125 are created.

Figure 9:
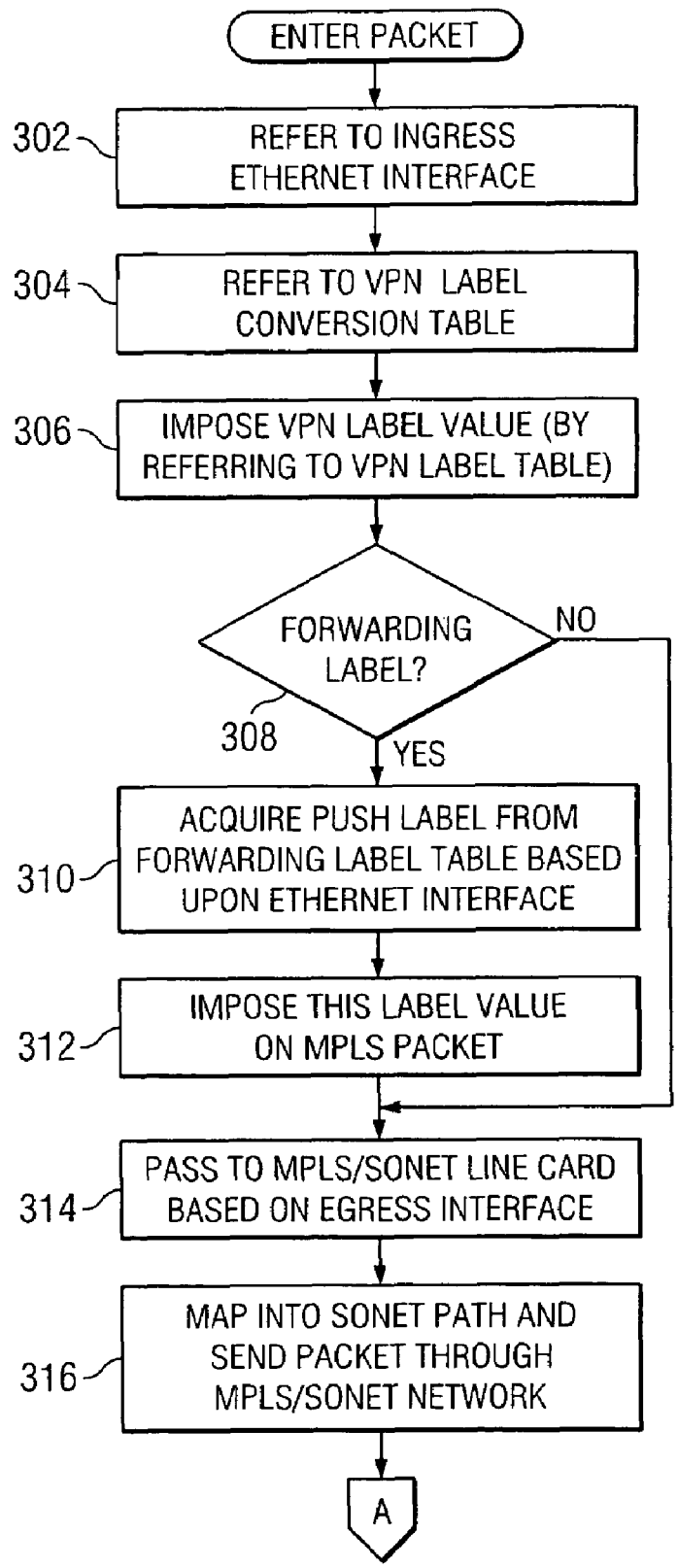
FIG. 9 illustrates one embodiment of a first part of a method for VLAN-mapped MPLS/SONET transmit processing.
Figure 10:
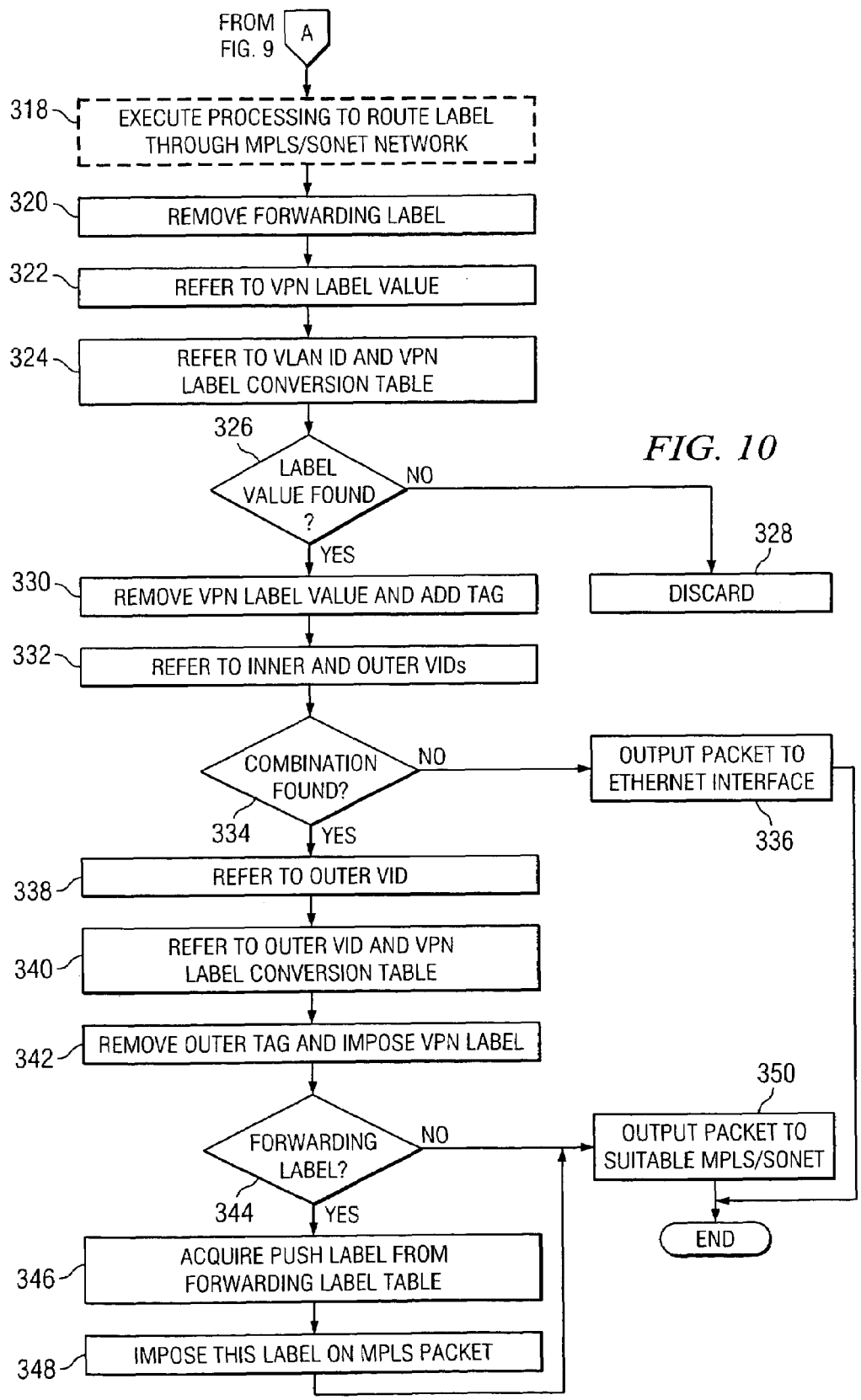
FIG. 10 illustrates one embodiment of a second part of the method for VLAN-mapped MPLS/SONET transmit processing.

FIGS. 9-10 illustrate one embodiment of the method for VLAN-mapped MPLS/SONET transmit processing. In this embodiment, VLAN packets 150 are received via Ethernet channels and transmitted as MPLS packets over one or more SONET paths in MPLS/SONET network 110 of FIG. 1.

Referring to FIGS. 9-10, when a packet arrives as an input via an ingress Ethernet interface, MSPP 111-114 determines the ingress Ethernet interface at step 302. Next, at step 306, subrouter 123i refers to the VPN label table at step 304. The MSPP adds a VPN label value (VPN label) 156 associated with the ingress Ethernet interface at step 306.

If a forwarding label is required at step 308, then the execution proceeds to step 310. At step 310, MSPP 111-114 refers to forwarding label table 133 to find the forwarding label (push label) and imposes the push label on MPLS packet 154. If the forwarding label is not required, then execution proceeds to step 314. At step 314, the MPLS packet is passed to an MPLS/SONET line card 128 based on the ingress Ethernet interface. At step 316, the packet 154 is sent to MPLS/SONET line card 128 to map the MPLS packet 154 into a SONET path.

The above is the processing executed by MSPP 111-114 on the transmitting side. This is followed by execution of processing for routing MPLS packet 154 through MPLS/SONET network 110. MPLS packet 154 is forwarded to the target MSPP 111-114, along the set route through MPLS/SONET network 110 while forwarding label 158, if included, is replaced at step 318.

The receiving MSPP 111-114 removes any included forwarding label 158 at step 320. Next, MSPP 111-114 extracts the VPN label 156 at step 322, refers to table 124 indicating the correspondence between the outer VLAN ID (=VID) and VPN label at step 324 and checks to see whether the VID has been found at step 326. If the outer VID was not found, MSPP 111-114 discards packet 154 at step 328. If the VID has been found, however, MSPP 111-114 removes VPN label 156 and adds an outer tag 152 that contains the outer VID to create a VLAN packet 160 at step 330. Next, MSPP 111-114 refers to the combined inner and outer VIDs at step 332 to determine if the combined VIDs is identified. If the combination is not identified at decisional step 334, then, at step 336, MSPP 114 forwards the VLAN packet 160 to an Ethernet line card 121 for transmission through VLAN 102. If the combination is identified at decisional step 334, then MSPP 114 refers to the outer VID at step 338. Next, at step 340, MSPP 112 extracts the value of the outer VLAN ID (=VID) contained in tag 160. The MSPP removes tag 162 and imposes a VPN label at step 342. If a forwarding label is required at step 344, then the execution proceeds to step 346. MSPP 112 refers to forwarding label table 133 to find the forwarding label (push label) at step 346 and imposes the push label at step 348. If the forwarding label is not required, then execution proceeds to step 350. At step 350, the MPLS packet is passed to an MPLS/SONET line card 128B based on the VPN label and the MPLS packet 154 is mapped to one or more SONET paths for transmission over network 105.

FIGS. 11A-B illustrate one embodiment of correspondence between user priority and a VLAN and IP precedence and MPLS. Referring to FIG. 17A, tag 152 of a VLAN packet 150 includes three-bit user priority and it is arranged so that the priority value stipulated by each MAC is entered using these three bits. A priority value can take on eight values of 0-7. User priority is low if the value is small (e.g., zero) and high if the value is large.

The label of an MPLS packet 154, on the other hand, includes a three-bit experimental field EXP, as shown in FIG. 17B. IP precedence is expressed using these three bits. IP precedence also is a priority value that can take on eight levels of 0-7. Priority is low if the value is small (e.g., zero) and high if the value is large. Accordingly, when a conversion is made from a VLAN packet 150 to an MPLS packet 154 in an MSPP 211-213, the three-bit user priority is inserted into the EXP field. When a conversion is made from an MPLS packet 154 to a VLAN packet 150, the IP precedence of the three-bit EXP field is inserted into the user-priority field. Thus, in one embodiment, priority control in a VLAN can be continued as IP precedence control in an MPLS network. Further, it is possible to return from IP precedence control to the original priority control in a VLAN.

Figure 12:
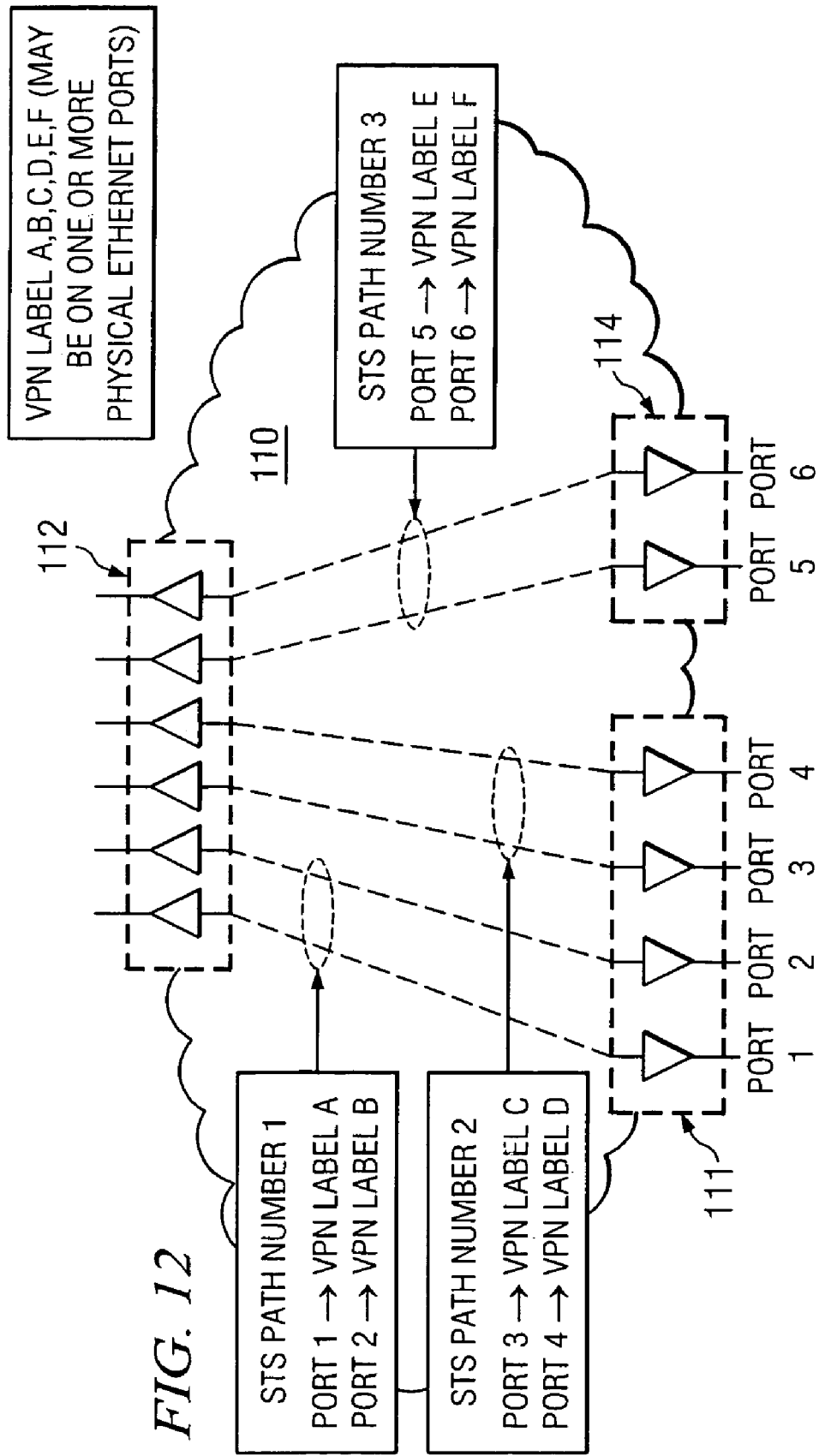
FIG. 12 illustrates exemplary transmission of packets between MSPPs of MPLS/SONET network of FIG. 1.

FIG. 12 illustrates exemplary transmission of packets between MSPPs of MPLS/SONET network 110 of FIG. 1. In particular, FIG. 12 illustrates example STS paths in which MPLS packets are transmitted from MSPP 111 and 114 to MSPP 112.

MSPP 111 receives ingress VLAN packets 150 over ports 1 to 4. When each packet 150 enters MSPP 111, the router generates an MPLS packet 154 by adding VPN label 156 associated with the ingress Ethernet interface and forwarding label 158 (push label), where appropriate, and maps the MPLS packet over a SONET path such as, for example, STS path number 1-3. MPLS packet 154 subsequently arrives at the receiving MSPP 112 along the preset path through MPLS/SONET network 110 while its forwarding label 158, if included, is replaced. The receiving MSPP 112 creates VLAN packet 160 by removing labels 156 and 158 and adding an outer tag 162 including an outer VID that is associated with the ingress interface. MSPP 112 sends the VLAN packet 160 to the appropriate interface based on the combined inner and outer VID, which may be an internal interface 134 or an Ethernet line card 121.

Figure 13:
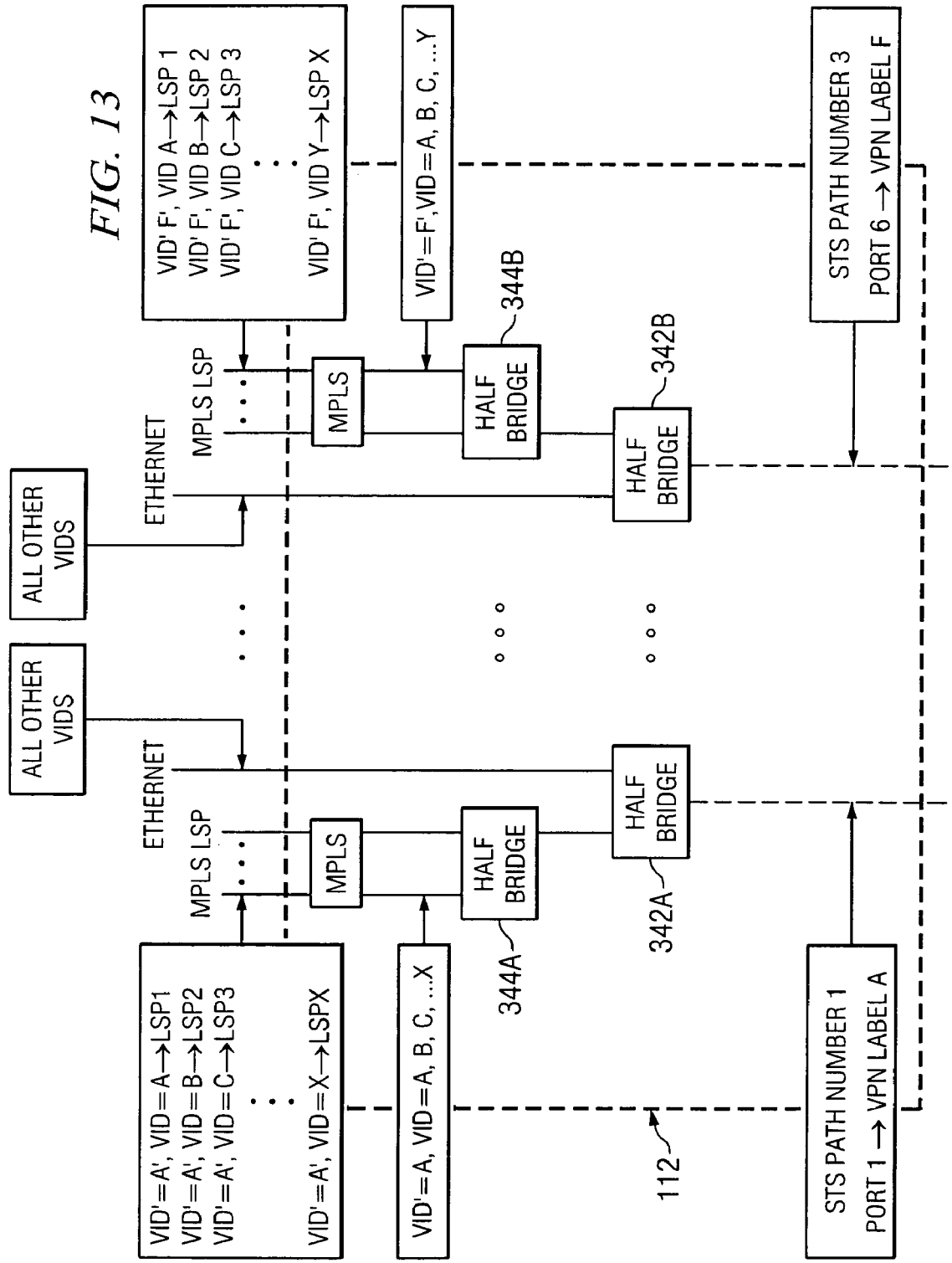
FIG. 13 illustrates exemplary processing of packets by the MSPP illustrated in FIG. 3.

FIG. 13 illustrates exemplary processing of packets of MSPP 112 of FIG. 3. In particular, FIG. 13 illustrates example label switch paths (LSPs) in which MPLS packets are transmitted from MSPP 112 to MPLS network 105 of FIG. 1.

MSPP 112 receives MPLS packets 154 over STS paths number 1 and 3. When each packet 154 enters MSPP 112, the first half bridge 342 generates a VLAN packet 160 by removing VPN label 156 associated with the ingress Ethernet interface and forwarding label 158 (push label), where appropriate, and adding an outer tag 162 including an outer VID. In one embodiment, the first half bridge 342 looks up the conversion of the VPN label in the table illustrated in FIG. 5B. The first half bridge 342 refers to the inner and outer VID of each VLAN packet 160 to determine if the combination of VIDs are identified. If the combine VIDs are not identified, the first half bridge 342 forwards the VLAN packet 160 to VLAN 102 via Ethernet line card 121. If the first half bridge does identify the combined VIDs, the first half bridge forwards the VLAN packet 160 to the second half bridge 344 for conversion to an MPLS packet for transmission over network 105. The second half bridge removes the outer tag 162 and replaces it with a VPN label and forwarding label and maps the MPLS packet on to one or more SONET paths in network 105.

Although the present invention has been described in detail, various changes and modifications may be suggested to one skilled in the art. It is intended that the present invention encompass such changes and modifications as falling within the scope of the appended claims.

What is claimed is:

1. A virtual private network (VPN), comprising:
a first core network and a second core network, each core network comprising a SONET over shared label switching network;
a plurality of Virtual Local Access Networks (VLANs), each coupled to a Multiservice Provisioning Platform (MSPP) of the first and second core networks, the VLANs each communicating traffic with a corresponding MSPP utilizing Ethernet over a plurality of Ethernet interfaces; and
the MSPP interfacing the VLANs with the first and second core networks based, in part, on the plurality of Ethernet interfaces, wherein the MSPP comprises a first half bridge operable to only replicate traffic entering the first core network, only learn layer 2 address information from the first core network, and perform split horizon forwarding, and wherein the MSPP comprises a second half bridge operable to only replicate traffic entering the second core network, only learn layer 2 address information from the second core network, and perform split horizon forwarding.

2. The VPN of claim 1, wherein the shared label switching comprises Multiprotocol Label Switching (MPLS).

3. The VPN of claim 2, the MSPP each operable to convert an ingress VLAN packet received from a first VLAN and associated with an ingress Ethernet interface to an MPLS packet and to send the MPLS packet to the SONET network based on the ingress Ethernet interface; and convert the MPLS packet over SONET packet received from the SONET network to either an egress MPLS packet associated with a disparate SONET network or an egress VLAN packet.

4. The VPN of claim 3, the MSPP each comprising a first table storing correspondence between VLAN identifiers (VIDs) contained in VLAN packets and VPN labels contained in MPLS packets.

5. The VPN of claim 4, wherein an MSPP transmitting traffic entering one of the core networks is operable to determine a VPN label, the VPN correspondence to a VLAN identifier (VID) of a VLAN packet, from the first table, generates an MPLS packet having the VPN label and transmits the MPLS packet over the core network.

6. The VPN of claim 5, wherein an MSPP receiving traffic exiting one of the core networks is operable to determine a VID, which corresponds to a VPN label contained in an MPLS packet received from the SONET network, from the first table, generates a VLAN packet having the VID and transmits the VLAN packet to a VLAN indicated by the VID.

7. The VPN network of claim 6, wherein each MSPP comprises:
a route decision unit for determining an outgoing interface which directs an MPLS packet to an egress MSPP associated with the Ethernet interface and is operable to receive egress traffic exiting one of the core networks; and
a second table for storing egress interfaces mapped to addresses of egress MSPPs.

8. The VPN of claim 7, wherein an MSPP transmitting ingress traffic entering one of the core networks is operable to determine an outgoing interface, which corresponds to the egress MSPP, from the second table, generates an MPLS packet that contains the VPN label and sends the MPLS packet to the SONET network.

9. The VPN network of claim 7, wherein the egress interface comprises a physical interface and a SONET path.

10. The VPN of claim 7, wherein the route decision unit further determines a forwarding label based on a corresponding Ethernet interface.

11. The VPN of claim 1, the core network operable to pass Ethernet control traffic transparently.

12. The VPN of claim 1, wherein the core network does not participate in a Ethernet switch control plane.

13. The VPN of claim 1, wherein the MSPP is further operable to interface the core networks with a disparate SONET network based, in part, on an associated VLAN identifier.

14. An Multiservice Provisioning Platform (MSPP) of a shared label switching over SONET network, comprising:
- a first VPN subrouter coupled to an Ethernet interface and operable to convert a Virtual Local Access Network (VLAN) packet to a label switching packet based, in part, on the Ethernet interface and to send the label switching packet to a corresponding label switching over SONET line card;
- a first label switching over SONET line card operable to receive a label switching packet from a first shared label switching over SONET network and map the label switching packet into one or more SONET paths for transmission over the first shared label switching over SONET network; and
- a second label switching over SONET line card operable to receive a label switching over SONET packet from a second shared label switching over SONET network;
- a shared label switching interface coupled to the second label switching over SONET line card and operable to receive a label switching over SONET packet from the second label switching over SONET line card;
- a VPN unit coupled to the shared label switching interface and operable to identify a VPN for a label switching over SONET packet received by the interface and to send the label switching over SONET packet to a second VPN subrouter based on the VPN; and p1 the second VPN subrouter operable to convert the label switching packet to a VLAN based, in part, on a VLAN identifier and to send the VLAN packet to the first subrouter via the Ethernet interface for converting the VLAN packet to a label switching over SONET line packet based, in part, on the shared label switching interface.

15. The MSPP of claim 14, wherein the label switching over SONET network comprises a Multi Protocol Label Switching (MPLS) network.

16. The MSPP of claim 15, wherein each VPN subrouter is operable to convert a VLAN packet to an MPLS packet by replacing a tag of the VLAN packet with a VPN label and a forwarding label, or by retaining the tag of the VLAN packet and adding a VPN label and a forwarding label.

* * * * *

UNITED STATES PATENT AND TRADEMARK OFFICE
CERTIFICATE OF CORRECTION

PATENT NO. : 7,433,359 B2
APPLICATION NO. : 10/856586
DATED : October 7, 2008
INVENTOR(S) : Paul F. Havala et al.

It is certified that error appears in the above-identified patent and that said Letters Patent is hereby corrected as shown below:

Column 2, L. 66: After "101-104 and a" delete "IP/IMPLS" and insert --IP/MPLS--.

Column 14, L. 7: After "VPN; and" delete "p1";

Signed and Sealed this

Fifteenth Day of September, 2009

David J. Kappos
*Director of the United States Patent and Trademark Office*